United States Patent Office 3,535,408
Patented Oct. 20, 1970

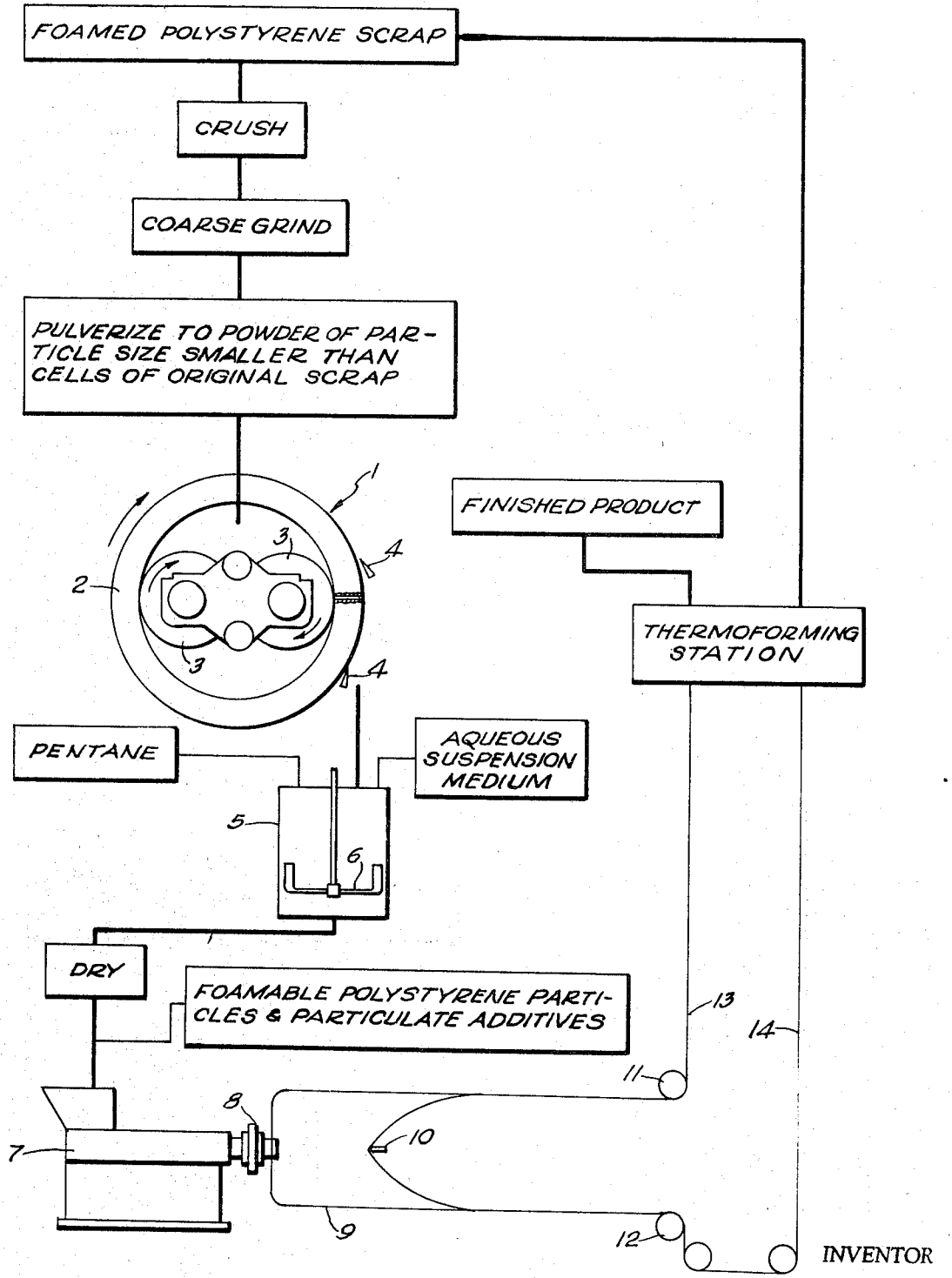

3,535,408
RECOVERY AND UTILIZATION OF SCRAP IN PRODUCTION OF FOAMED VINYL AROMATIC POLYMERIC PRODUCTS
Clifford P. Ronden, Edmonton, Alberta, Canada, assignor to Cupples Container Company, Austin, Tex., a corporation of Missouri
Filed Apr. 4, 1968, Ser. No. 718,667
Int. Cl. B29d 27/00
U.S. Cl. 264—37                                 6 Claims

ABSTRACT OF THE DISCLOSURE

Scrap foamed vinyl aromatic polymeric material, and particularly scrap foamed polystyrene, is recovered by a procedure including forming the scrap into dense granules, impregnating the granules with a normally liquid low boiling hydrocarbon blowing agent, blending the blowing agent-containing granules with fresh foamable polymeric particles, and subjecting the resulting mixture to a processing step, such as sheet extrusion, involving heat plastification of the polymeric material.

---

This invention relates to the manufacture of shaped articles from foamable thermoplastic polymeric material, and particularly to an improved method for recovering and reusing foamed scrap material during such manufacture.

It is now common practice to manufacture shaped articles of many kinds from foamable thermoplastic polymeric material. Some articles, such as drinking cups, are produced by closed mold molding. Other articles, such as meat trays and egg cartons, are produced by thermoforming from foamed polymeric sheet. In all such manufacturing procedures, a significant amount of scrap foamed material is produced, both in the form of finished products rejected during inspection, and as trimmings. Particularly in thermoforming operations, the amount of scrap produced is so large as to constitute an important economic factor. Prior-art workers have accordingly been concerned with finding a way to recover the scrap foamed material in such fashion that the material can be recycled, but such efforts have encountered severe difficulties arising from the low density of the scrap and the fact that the scrap has relatively little residual foaming capability.

The overall result of the low density and limited residual foaming capability of the scrap has been to severely limit the proportion of the scrap which can be recycled without too great an adverse affect on the finished goods. Recycling of more than a few percent of the scrap has resulted in nonuniformity of the product, and in an inadequate foaming of the polymeric material. The problems are particular severe when the manufacturing procedure is on which employs foamable polymeric particles, such as beads or pellets, as the starting material.

It is accordingly a general object of the invention to devise a method whereby all or a major proportion of the scrap foamed polymeric material can be recycled without unduly affecting the uniformity and density of the finished articles.

Another object is to provide such a method which is particularly useful in connection with manufacturing procedures employing foamable particles as the fresh raw material.

Generally stated, the invention involves conversion of the scrap foamed material into pellets without heat plastification, and impregnation of the pellets with a blowing agent or agents so as to provide foamable particles which can be combined with the fresh feed.

In order that the manner in which the foregoing and other objects are attained in accordance with the invention can be understood more fully, one particularly advantageous embodiment thereof will be described in detail with reference to the accompanying drawing which forms part of this specification and wherein the single figure is a flow diagram illustrating the invention as applied to a manufacturing procedure involving extrusion of foamed polymeric sheet and thermoforming articles therefrom.

The invention is applicable to the recovery of foamed thermoplastic scrap generally, including for example, the various foamed vinyl aromatic polymers and copolymers; the high molecular weight polymers of ethylenically unsaturated aliphatic hydrocarbons, particularly polyethylene and polypropylene; the polymers of halogenated ethylenically unsaturated aliphatic monomers, such as polytetrafluoroethylene; and the nylons. However, the invention finds it greatest utility, and is most advantageous, in the recovery of foamed polystyrene scrap.

Foaming of such thermoplastic materials within the context of the invention can be accomplished with any blowing agent, or combination of blowing agents, capable of generating a gas pressure adequate to expand the thermoplastic material in cellular fashion in response to temperatures in the softening range for the particular polymeric material employed. Normally liquid agents which boil below the softening range of the polymeric material are particularly suitable. Such agents include the low boiling hydrocarbons in which the polymeric material is not substantially soluble, e.g., petroleum ether, pentane, hexane, heptane, isopentane, and cyclohexane. Similar materials which are gaseous at normal temperatures, such as butane, can be used, as can cases such as air, nitrogen, and carbon dioxide. Though less desirable in some respects than simple low boiling hydrocarbons, low boiling halogenated hydrocarbons such as dichlorodifluoromethane, can be employed. Also useful are various organic nitrogen compounds such as azobisisobutyronitrile, the azoamides, and nitroso compounds such as N,N'-dimethyl-,N'-dinitrosoterethalamide.

The invention is especially applicable to the recovery of scrap foamed sheet, particularly foamed polystyrene sheet, produced by extrusion from polymeric particles each containing a low boiling hydrocarbon blowing agent and a nucleating agent. Typically, the nucleating agent can be in situ generated carbon dioxide or nitrogen.

The method of the invention comprises the steps of reducing the scrap to particulate form, converting the resulting particulate polymeric material into granules of a size compatible with the beads or granules which are to be used as the fresh raw material feed, impregnating the granules with the blowing agent, and then blending the impregnated granules with the fresh feed. Reduction of the scrap to particulate form is advantageously accomplished by first crushing the scrap, as by passing it between crushing rolls effective to reduce the thickness to from ½ to ⅒ the original thickness, coarse grinding the crushed material to convert it to particles having an average maximum dimension of 0.05–0.2 in., and then pulverizing the coarse ground material to powdered form with the particles of the powder being smaller than the cells of the original foamed scrap so that the particles are essentially solid polymeric material, free of voids, and have a fairly regular configuration. Advantageously, the maximum dimension of all of the particles of the powder is in the range of 0.001–0.006 in., with the average maximum dimension not exceeding about 0.004 in. Pulverizing of the coarse ground scrap can be accomplished in a water cooled pulverizing mill, such as the Model PA12 pulverizer manufactured by Pallmann Pulverizers Co., Inc., Clifton, N.J. 07012.

Conversion of the powdered material into the form of granules can be accomplished by extruding the powder, without additives, through a die orifice, the extruding operation being accomplished by high mechanical pressure without heating, other than the heat generated by the extrusion operation itself, and cutting off the extruded product to provide the particle. Such an action is best accomplished by use of a pellet mill of the type indicated generally at 1 in the drawing and comprising a die ring 2 provided with radial die orifices and mounted for rotation about a fixed axis, there being two pressure rollers 3 mounted for free rotation about fixed axes parallel to the axis of rotation of the die ring and spaced diametrically across that axis in such fashion as to apply rolling pressure to the particle feed, so forcing the material outwardly through the die orifices, as the die ring is rotated. Stationary cutters 4 are positioned adjacent the outer surface of the die ring to cut off the extruded product.

The pellet mill, or equivalent apparatus, is selected and operated to form dense granules, typically in the form of short cylinders, with a maximum dimension in the range of 0.02–0.14 in., depending upon the particle size range of the fresh raw material feed to which the granules are to be recycled.

Instead of employing only the pulverized scrap for conversion to granules, and depending primarily on the action of the pressure of extrusion for conversion of the powder to coherent granules, a small proportion of a compatible binder material can be employed. Thus, for example, when the scrap being recovered is polystyrene, ethylene vinyl acetate copolymer can be employed as the binder in amounts in the range of 0.5–5% of the weight of the scrap polystyrene. The ethylene vinyl acetate copolymer in powder form is simply blended with the powdered scrap material before the conversion of the material into granules. Other suitable binders include the low molecular weight polyethylene-paraffin wax mixtures, and low molecular weight chlorinated polyethylene.

Provision of the blowing agent in the finished granules of the scrap can be accomplished in various ways. Where a normally solid blowing agent is employed, the blowing agent can simply be admixed with the powdered scrap material prior to formation of the granules. In the case of the usually more desirable low boiling normally liquid agents, however, the granules are impregnated with the blowing agent. As indicated diagrammatically in the drawing, this is best accomplished by delivering the granules to a pressure-tight vessel 5 equipped with a rotary stirrer 6. An inert liquid suspension medium is introduced and the stirrer operated to keep the granules in gentle motion. An inert gas can be introduced above the suspension liquid to maintain the contents of the vessel under superatmospheric pressure. The vessel is heated to bring the supension medium to an elevated temperature distinctly below the softening range for the particular thermoplastic polymeric material involved. The normally liquid blowing agent is then pumped into the vessel, typically in separate quantities spaced over a significant time period, and the vessel is then maintained at the elevated temperature and presssure until impregnation of the blowing agent into the polymeric granules is complete. The granules are then discharged from the vessel, recovered from the liquid by sieving or centrifuging, and dried at a temperature adequate low to avoid activation of the blowing agent.

The proportion of the blowing agent introduced into the granules depends upon the particular manufacturing procedure involved, e.g., extrusion-thermoforming, closed mold molding, etc., and is maintained in the general range of 2–12%, based on the weight of the polymeric granules. When the manufacturing procedure involves extrusion of foamed sheet, it is advantageous to introduce the blowing agent into the granules in an amount in the range of 6–9% of the original granule weight.

When a solid additive is employed which is undesirable as a freely exposed constituent in processing, it is advantageous to blend that additive with the powdered polymeric material preparatory to feeding the same to the pellet mill 1 or like apparatus. Thus, when critic acid and sodium bicarbonate are employed as a nucleating gas source, the critic acid is blended with the powdered scrap polymeric material so as to be distributed throughout the granule. As a result, when the granules are processed in an extruder along with fresh foamable polymeric material, plate-out of sodium citrate on the exposed internal surfaces of the extruder is minimized.

The blowing agent-impregnated granules are blended with the fresh foamable thermoplastic material and any particulate additives not previously introduced, preferably employing a water cooled ribbon blender, the blending operation being carried out for a time adequate to assure that the granules of recovered scrap are distributed uniformly throughout the larger volume of fresh material. Since the granules carry their own blowing agent, are of the same polymeric material as the fresh feed, and, being dense in form and practically free of voids and air, have a minimal tendency to cause non-uniformity of the total thermoplastic mass during processing, a higher recycle rate can be achieved than has heretofore been possible. Thus, in the manufacture of foamed polystyrene sheet by extrusion, the recovered scrap, now in granular form, can be blended with the fresh feed in such proportions as to constitute as much as 80% of the total weight of the blend.

In the embodiment of the invention illustrated in the drawing, the blend of recovered scrap and fresh foamable polymeric material is delivered continuously to the feed hopper of an extruder 7 equipped with a die 8 having a peripheral orifice, the extruded product being in the form of a tube 9 which is slit continuously at diametrically opposed points by cutter 10. The two halves of the tube are then led over rolls 11, 12, respectively, so providing two flat running webs of foamed sheet, indicated respectively at 13 and 14. The running webs are led to a thermoforming station equipped with continuously operating thermoformers for forming finished articles from the sheet and separating the articles by a trimming operation. The scrap resulting from the trimming operation is delivered to the crushing apparatus, along with such other scrap as reject products, and the process commences again as hereinbefore described.

The invention is most advantageous when practiced in connection with manufacturing procedures which employ foamable beads, such as are produced by suspension polymerization, or foamable granules, such as are obtained by extruding filaments of foamable polymeric material and severing the filaments into granules, both the beads and the granules falling within the term "foamable polymeric particles" as used herein. The foamable particles of fresh polymeric material can be in the range of 0.008–0.125 in.

The following examples are illustrative:

EXAMPLE 1

Foamed polystyrene sheet of 0.035 in. thickness is produced according to the flow diagram of the accompanying drawing, using a 4½" single screw extruder having a 20:1 length-to-diameter ratio and equipped with a die having a radial orifice and constructed generally in accordance with my U.S. patent application Ser. No. 582,946, filed Sept. 29, 1966. The fresh raw material feed is polystyrene in the form of beads produced by suspension polymerization, the molecular weight being 130,000–150,000, and the beads having a pentane content of 6.5–7% by weight established by suspension impregnation of the fully polymerized beads. Beads in the size range of 0.008–0.07 in are employed. The heads are uniformly blended with 0.4% by weight citric acid and 0.2% sodium bicarbonate for in situ production of carbon dioxide as a nucleating agent.

The extruder is operated at a screw speed of 10–50 r.p.m., an ascending temperature profile with a maximum temperature of 230–250° F., a die body temperature of 240–260° F., and a head pressure of 1500–2000 p.s.i. Outputs of 160–250 lbs. per hour are obtained. The extruded sheet has an average density of 4 lbs. per cu. ft., with an average cell diameter less than 0.01 in.

The sheet is post expanded and aged and then passed continuously through conventional thermoforming apparatus for production of meat trays, with a trimming operation which leaves scrap, in the form of trimmings, amounting to approximately 30% of the weight of the sheet.

The scrap is fed through crushing rolls operating to reduce the thickness to approximately ⅓ that of the uncrushed scrap. The crushed scrap is fed to a conventional scrap grinder for coarse grinding to an average maximum dimension of 0.1 in., and the coarsely ground material is pulverized to powder form, using a water cooled Pallman Model PA-12 pulverizer, the maximum dimension of all of the particles of the powder being less than 0.006 in. and the average maximum dimension of the particles being approximate 0.0035 in.

The powdered scrap is fed, without additives, to a rotary pellet mill of the type shown diagrammatically at 1 in the drawing, the die ring of the pellet mill having cylindrical die apertures 0.1 in. in diameter. The powdered scrap is progressively compacted between the inner periphery of the die ring ast the pressure rollers 3, and the resulting high pressure forces the powder into and outwardly through the die apertures so that a smooth, dense, cylindrical rod of compacted polystyrene is forced out of each die aperture. The rate of extrusion through the die apertures and the rate of rotation of the die ring relative to cutters 4 are so selected that the extruded rods are severed into lengths of approximately 0.1 in., so that the compacted polystyrene is in the form of short cylindrical granules.

The granules thus produced are supplied to the vessel 5, and water is introduced, as a suspension medium, in the porportion of 3 parts by weight water for each part by weight of the scrap styrene granules. Nitrogen is then pumped into the closed and sealed vessel until an internal pressure of at least 40 p.s.i. is attained. The vessel is then heated to 90–130° C., with constant agitation of the suspension. With the temperature of the suspension maintained in the 90–130° C. range, pentane is then pumped into the vessel continuously over a period of 6–12 hrs., and the elevated temperature, pressure and agitation maintained for an additional 1–4 hrs. The vessel is then cooled to bring the temperature of the suspension down to 75–5° F., and the suspension is then discharged and the pentane-impregnated granules recovered by screening. The recovered granules are then air dried, holding the temperature of the granules below 80° F., the dried granules having a pentane content of 6.5–7.5% by weight.

Using a water-cooled ribbon blender, the dry granules of recovered scrap polystyrene are blended with additional fresh polystyrene beads in a weight ratio of 3:7, and citric acid and sodium bicarbonate are added to the mixture in proportions of 0.4% and 0.2% by weight, respectively, based on the total polystyrene weight.

The mixture so prepared is supplied to the extruder, and the extruder is operated to extrude foamed polystyrene sheet as first described in this example, the sheet so produced being essentially the same as that produced initially from the fresh foamable polystyrene feed.

EXAMPLE 2

The procedure of Example 1 is repeated, save that the fresh foamable polystyrene employed is in the form of extruded granules of uniform size, the granules being generally cubical and having a maximum dimension slightly less than 0.1 in., each granule containing 0.4% by weight citric acid. The procedure is further modified by blending the powdered scrap polystyrene with 0.4% by weight citric acid prior to feeding the same to the pellet mill, so that the compacted granules of scrap polysyrene each contain approximately 0.4% by weight of citric acid.

EXAMPLE 3

The procedure of Example 2 is repeated, save that, in addition to the citric acid, 2% by weight of powdered ethylene vinyl acetate copolymer is blended with the powdered scrap polystyrene before delivering the same to the pellet mill.

What is claimed is:

1. In the production of shaped articles having a cellular structure from foamable thermoplastic vinyl aromatic polymeric material by a process in which a significant amount of scrap foamed vinyl aromatic polymeric material results, the improvement comprising disintegrating the scrap to a particulate form of such fineness that the average maximum dimension of the particles of the disintegrated scrap is significantly smaller than the average cell diameter of the original scrap material, the particles therefore being essentially void-free, solid vinyl aromatic polymeric material;

converting the resulting finely particulate scrap into dense granules by applying pressure to a mass of the particles and forcing the same through die orifices to cause the particles to fuse together as a result of being forced through the die orifice;

introducing a normally liquid low boiling hydrocarbon blowing agent into the resulting dense granules to render the same foamable;

uniformly blending said dense granules with fresh foamable thermoplastic vinyl aromatic polymeric particles; and converting the resulting blend into a foamed shaped product by a procedure in which the blend is thermally plastified while being mechanically confined.

2. The improvement defined in claim 1, wherein the scrap comprises trimmings from extruded foamed vinyl aromatic polymer sheet having an initial average cell diameter less than 0.02 in., and said step of disintegrating the scrap includes pulverizing the same to a finely particulate product having a particle size in the range of 0.001–0.006 in.

3. The improvement defined in claim 2, wherein the scrap and fresh foamable thermoplastic particles are polystyrene; and said step of introducing a blowing agent into said dense granules is carried out by suspending said granules in an inert liquid suspension medium, introducing into the suspension a low boiling normally liquid hydrocarbon, in which the polystyrene is not substantially soluble, and agitating the suspension while maintaining the same at an elevated temperature below the softening range of the polystyrene to cause said low boiling hydrocarbon to impregnate said granules.

4. The improvement defined in claim 1, wherein the scrap is foamed polystyrene, and a powdered binder material selected from the group consisting of ethylene vinyl acetate copolymer, polyethylene-paraffin wax mixtures, and chlorinated polyethylene is uniformly mixed with said finely particulate scrap prior to said step of converting said scrap into granules, said powdered binder amounting to 0.5–5% of the weight of said finely particulate scrap.

5. The improvement defined in claim 1, wherein the scrap is polystyrene in the form of trimmings from extruded foamed polystyrene sheet, and powdered ethylene vinyl acetate copolymer is mixed with said finely divided scrap, in an amount equal to approximately 2% of the weight of said scrap, prior to said step of converting said scrap into granules.

6. The method for converting foamed polystyrene scrap into dense granules capable of being impregnated with a normally liquid low boiling blowing agent and combined with fresh foamable polystyrene particles for processing by extrusion or closed mold molding, comprising

- distintegrating the polystyrene scrap to a particulate form of such fineness that the average maximum dimension of the particles of the disintegrated scrap is significantly smaller than the average cell diameter of the original polystyrene scrap and said particles are therefore essentially solid and void-free;
- mixing the resulting finely particulate scrap with an amount of ethylene vinyl acetate copolymer equal to 0.5–5% of the weight of said finely patriculate scrap; and
- applying pressure to a mass of said finely particulate scrap and forcing the same through die orifices to cause the particles to fuse together as a result of being forced through the die orifice.

References Cited

UNITED STATES PATENTS

| | | | |
|---|---|---|---|
| 2,838,801 | 6/1958 | DeLong | 264—53 X |
| 3,192,293 | 6/1965 | VanRiper | 264—143 X |
| 3,224,984 | 12/1965 | Roper. | |
| 3,293,196 | 12/1966 | Nakamori. | |
| 3,344,212 | 9/1967 | Francis | 264—53 X |

FOREIGN PATENTS 623,804   7/1961   Canada.

DONALD J. ARNOLD, Primary Examiner

P. A. LEIPOLD, Assistant Examiner

U.S. Cl. X.R.

264—321, 53, 51

PO-1050
(5/69)

UNITED STATES PATENT OFFICE
CERTIFICATE OF CORRECTION

Patent No. 3,535,408          Dated October 20, 1970

Inventor(s) Clifford P. Ronden

It is certified that error appears in the above-identified patent and that said Letters Patent are hereby corrected as shown below:

Column 1, line 54, "particular" should read --particularly--.

Column 2, line 32, "cases" should read --gases--.

Column 3, line 63, "adequate" should read --adequately--.

Column 4, line 3, "critic" should read --citric--.

Column 4, line 5, "critic" should read --citric--.

Column 4, line 71, "0.008-0.07 in" should read --0.008-0.07 in.--

Column 5, line 28, "ast" should read --and--.

Column 5, line 40, "porportion" should read --proportion--.

Column 5, line 51, "75-5° F." should read --75-85° F.--

SIGNED AND
SEALED
FEB 2 1971

(SEAL)
Attest:

Edward M. Fletcher, Jr.
Attesting Officer

WILLIAM E. SCHUYLER, JR.
Commissioner of Patents